(12) United States Patent
Sadikovic

(10) Patent No.: US 7,267,720 B2
(45) Date of Patent: Sep. 11, 2007

(54) METHOD FOR PREPARING A BUILDING MATERIAL

(75) Inventor: Ahmet Sadikovic, Paderborn (DE)

(73) Assignee: Optos Optimale Oszillationstechnick GmbH, Warburg (DE)

( * ) Notice: Subject to any disclaimer, the term of this patent is extended or adjusted under 35 U.S.C. 154(b) by 0 days.

(21) Appl. No.: 10/862,316

(22) Filed: Jun. 8, 2004

(65) Prior Publication Data

US 2005/0172865 A1    Aug. 11, 2005

(30) Foreign Application Priority Data

Feb. 5, 2004    (EP) ................... 04075379

(51) Int. Cl.
  *C04B 5/00*    (2006.01)
  *C04B 7/14*    (2006.01)
  *C04B 18/00*    (2006.01)

(52) U.S. Cl. ............ 106/789; 106/714; 106/715; 106/624; 106/790; 106/791; 106/782; 106/707

(58) Field of Classification Search ............ 106/714, 106/715, 624, 789, 790, 791, 782, 707
See application file for complete search history.

(56) References Cited

U.S. PATENT DOCUMENTS 4,306,910 A    12/1981  Hajime et al.
4,897,119 A  *  1/1990  Clarke ............................ 524/5
5,374,309 A  *  12/1994 Piniecki ...................... 106/714
5,482,549 A  *  1/1996  Blaakmeer et al. ......... 106/606
5,605,570 A  *  2/1997  Bean et al. .................. 106/673

FOREIGN PATENT DOCUMENTS

| EP | 0 431 503 | 6/1991 |
| FR | 772 204 | 10/1934 |
| GB | 1 312 079 | 4/1973 |
| WO | WO 99/67183 | 12/1999 |

OTHER PUBLICATIONS

Chemical Abstricts & Indexes, American Chemical Society, Columbus, US, May 18, 1981; 94:161681d.
Wang S.D. et al., "Alkali-Activated Slag Cement and Congrete: A Review of Properties and Problems", Advances in Cement Research, London, GB, vol. 7, No. 27, Jul. 1995, pp. 93-102.
Chemical Abstricts & Indexes, American Chemical Society, Columbus, US, Sep. 4, 1995, 123:1210784.
Patent Abstracts of Japan, vol. 1999, No. 05, May 31, 1999 & JP 11 049538, Feb. 23, 1999.

* cited by examiner

*Primary Examiner*—Elizabeth D. Wood
(74) *Attorney, Agent, or Firm*—Kenyon & Kenyon LLP

(57) ABSTRACT

A method of preparing a building material is provided. An aggregate material, water, a hydraulic binder material, and one or more hydraulic activators are mixed. The hydraulic binder material comprises slag material. The mixture is allowed to harden. A building material is also provided. The building material includes a slag material, and one or more hydraulic activators.

16 Claims, No Drawings

METHOD FOR PREPARING A BUILDING MATERIAL

CROSS REFERENCE TO RELATED APPLICATIONS

This application claims priority to EP Patent Application No. 04075379.0 filed 5 Feb. 2004 (published 10 Aug. 2005 as EP1561736A1), the content of which is incorporated herein by reference in its entirety.

BACKGROUND OF THE INVENTION

The present invention relates to a method for preparing a building material. In addition, the invention relates to the building material, obtainable by said method. The invention further relates to a binder composition for preparing a building material.

Cement is a so-called hydraulic binder material that is widely used in the preparation of building materials. A particular popular and well known variety of cement is Portland cement. Portland cement is used in many applications such as mortar, concrete, and other building materials such as building blocks. Portland cement is produced by pulverizing clinker to a specific area of generally about 3000 to 5000 $cm^2/g$. Clinker is created in a cement kiln at elevated temperatures from ingredients such as limestone, sand clay and fly ash. The cement kiln dehydrates and calcines the raw materials and produces a clinker composition comprised of tricalcium silicate ($3CaO$—$SiO_2$), dicalcium silicate ($2CaO$—$SiO_2$), tricalcium aluminate ($3CaO$—$Al_2O_3$) and tetracalcium aluminoferrite ($4CaO$—$Al_2O_3$—$Fe_2O_3$). The resulting clinker is typically ground to form fine dry cement powder. The finely ground cement generally is mixed with sand, coarse aggregate and water to produce mortars and concrete. Optionally, additives, such as plasticizers, may be added.

It is known to replace part of the Portland cement by slag material, such as granulated blast furnace slag. Blast furnace slag is a non-metallic product produced in the process of iron production. Blast furnace slag consists primarily of silicates, aluminosilicates, and calcium-alumina-silicates. Different forms of slag product are produced depending on the method used to cool the molten slag. These products include air-cooled blast furnace slag, expanded or foamed slag, pelletized slag and granulated blast furnace slag.

Granulated blast furnace slag is the glassy granular material, formed when molten iron blast furnace slag is rapidly chilled (quenched) by immersion in water. It is a granular product with very limited crystal formation. This type of slag consists primarily of silica ($SiO_2$) and alumina ($Al_2O_3$) combined with calcium and magnesium oxides (CaO and MgO).

As mentioned above, ground granulated blast furnace slag is a cementitious material and has been used as a partial substitute for (Portland) cement. Post-processing blast-furnace slag to produce slag containing cement diverts it from the solid waste stream and creates a valuable product: it can substitute for a portion of Portland cement in concrete (usually from 20-80%, depending on the application), improving strength and durability. Utilization of slag cement not only lessens the burden on landfills, it also reduces air emissions at steel plants through the granulation process (as compared to the traditional air cooling process). In addition, by using alternative cementitious materials like slag cement to partially replace portland cement, the production of carbon dioxide, as well as the energy use is significantly reduced.

Ground granulated blast furnace slag is only "latently" hydraulic, i.e. it does not bind automatically after admixture with water. Thus, it requires the presence of an activator to initiate the hydration process. Currently, one of the most used activators is Portland cement. When using Portland cement, however, relatively large amounts of $Ca(OH)_2$ are generated, which is an unstable and aggressive compound which causes many problems such as carbonation and resultant cracking of the concrete. Furthermore, concrete that has been produced with Portland cement will disintegrate at high temperatures (above 500° C.) as a consequence of the decomposition of the excess $Ca(OH)_2$ to CaO and $H_2O$, causing cracks and increased porosity.

Due to the important role of cement, concrete and concrete-like products in the engineering and construction industry, there is a continued need for improvements in the preparation and composition of cement and concrete. In particular, there is an ongoing search for cost-effective ways to prepare binder materials having improved binding properties for preparing stronger building materials.

SUMMARY OF THE INVENTION

The object of the present invention is to provide such cost-effective method for preparing a building material having improved properties.

This is achieved by the invention by providing a method comprising of mixing an aggregate material, water and a hydraulic binder material and one or more hydraulic activators and allowing the building material to harden, wherein the hydraulic binder material consists of slag material.

According to the present invention, slag material is used as the only hydraulic binder material, thus providing a cost-effective cement composition for use in making building materials.

The chemical and mineral composition of slag material, such as granulated blast furnace slags significantly differs from Portland cement, greatly influencing the reactivity and microstructure of the hardened cement and concrete. Thus, the building materials prepared with the method according to the invention exhibit improved properties in terms of water impermeability, tensile strength, compressive strength, and resistance to attack by acidic or salt water, sulphates, nitrogen and other chemicals and extreme and rapid temperature fluctuations. In addition, shrinkage and crack formation of the building materials are reduced as compared to building materials based on conventional (Portland) cement.

DETAILED DESCRIPTION

According to a preferred embodiment of the invention, the slag material used is ground to a specific area of approximately 3000-5000 $cm^2/g$. That is, the slag material used is ground to a fineness which is comparable to that of Portland cement, approximately 3500 $cm^2/g$. In contrast, prior to the invention slag material generally was ground to specific areas of at least 5000 $cm^2/g$ or more (up to 7000-9000 $cm^2/g$), contributing to much higher manufacturing costs.

According to the method of the invention, any industrial slag material may be used as the hydraulic binder material, in particular neutral or alkaline slags. Although the slag material may vary in chemical and mineral composition, a suitable cement composition can be made irrespective of the type of slag or the age thereof when slags are used wherein the ratio $Al_2O_3/SiO_2$ ranges from 0.1 to 0.6. Moreover, according to the present invention, relatively "low-quality", and thus relatively inexpensive, slags may be used wherein the ratio $Al_2O_3/SiO_2$ ranges from 0.1 to 0.3, due to the strong binding capacity of the activated slags.

According to a further embodiment of the invention, slag material preferably is used wherein the ratio $CaO/SiO_2$ ranges from 0.25-2.0, preferably 0.5-2.0.

Preferably, the slag material consists of ground granulated blast furnace slag derived from iron production, or slags derived from steel production or steel refinement.

According to a preferred embodiment of the invention, amorphous or glassy blast furnace slag is used. However, in order to enhance the formation of crystals during hardening of the material ground slags comprising a crystalline phase of 5-40% may be added.

In order to activate the latently hydraulic slags one or more activators are added. Although a number of factors influence the hydraulic activity of granulated blast furnace slag, including chemical composition, glass content and fineness, it has been found according to the present invention that several types of slags can be activated by using one or more alkaline activators. The activators used preferably comprise alkali metals and/or solutions thereof, such as sodium or potassium hydroxides, silicates and/or carbonates or solutions thereof. By using a combination of these alkaline activators a strongly alkaline mixture is formed. Due to the low solubility of $Ca(OH)_2$ in such strong alkaline mixture, during hardening of the cement in particular silicates and aluminosilicates are formed, which contribute to the excellent properties of the building material of the invention. For example, due to the remarkable density and tensile strength of the building material steel reinforcement may even become unnecessary.

According to a preferred embodiment of the method of the invention the activators consist of a mixture of sodium hydroxide, waterglass and sodium metasilicate and/or a solution thereof. According to the present invention, it has been found that these activators synergistically improve the binding capacity of the binder material. That is, the individual activators cooperatively enhance the binding capacity of the binder material. Preferably waterglass is used wherein the ratio of sodium:silicium is 1:1.5, preferably 1:1.2. Thus a binder composition is obtained which binds within 30-45 minutes.

Aggregates are inert granular materials, such as sand, gravel and crushed stone which form an essential ingredient in concrete. An additional advantage of the method according to the present invention is the possibility of using local and relatively cheap sand and other aggregates due to the strong binding capacities of the cement composition based on the activated slag material. Thus, according to the invention abundant materials such as desert sand, (polluted river and harbour) river sludge, unwashed sea sand and (industrial) waste materials such as fly ash may be used in the manufacture of building materials. In addition, for hydration of the cement even salt water may be used. The present invention thus provides a highly cost-effective method for preparing a building material by using slag material and other materials which previously were to be considered as useless and/or waste material.

Specific properties of the building material may be improved by the addition of additives. Such additives (or chemical admixtures) are the ingredients in concrete other than the hydraulic binder material, water and aggregate that are added to the concrete mix immediately before or during mixing. They are mainly used to modify the properties of hardened concrete and to ensure the quality of concrete during mixing, transporting, placing and curing. Special additives include plasticizers, shrinkage reducing admixtures and alkali-silica reactivity inhibitors. The shrinkage reducing admixtures control drying shrinkage and minimize cracking.

According to a preferred embodiment of the present invention the water impermeability of the building material is enhanced by admixing bivalent iron to the concrete mix. The iron is oxidized into an alkaline medium by oxygen in the air. In a further preferred embodiment an additional oxidative compound is added, such as potassium dichromate in order to reduce shrinkage and minimize cracking.

Conventional supplementary cementing materials contributing to the properties of hardened building material through hydraulic or pozzolanic activity, such as natural pozzolans and fly ash, may further also be used in the building material according to the present invention.

The present invention further relates to a building material obtainable with the method as described above. In its simplest form building materials such as concrete are a mixture of sand and other aggregate material, water and a binder material, such as cement. The binder material when mixed with water forms a pasty binder composition which coats the surface of the sand and coarse aggregates. Through hydration the binder paste hardens and gains strength to form the rock-like mass known as concrete. The character of the concrete is determined by the quality of the binder material.

The invention further relates to a hydraulic binder composition for preparing a building material, as described above. In particular, the invention relates to a binder material consisting of slag material and one or more activators. According to the invention the binder material can be prepared from readily available materials anywhere in the world. The hydraulic binder material binds when mixed with a variety of other materials, such as desert sand, and water. The binding process results in building materials with remarkable properties, i.e. having a very high strength, density, hardness, heat resistance, impermeability etc., which will be clear from the following examples which are merely illustrative and not intended to limit the invention in any way.

EXAMPLES

Example 1

A building material with the following composition was prepared:

1. 540 kg Basalt 0/2
2. 680 kg Basalt 2/5
3. 630 kg Basalt 5/8
4. 270 kg quartz sand 0/2
5. 320 kg ground slag material (3800 Blaine)
6. 10 kg iron powder
7. 3.2 kg phosphate (soluble $P_2O_5$)
8. 2.2 kg borate
9. 205 kg activator Components 1, 4, 5, 6, 7, 8 and 9 were mixed for four minutes until a homogenous mass is obtained. Thereafter the remaining components 2 and 3 were admixed.

The activator comprises: sodium metasilicate, sodium hydroxide and water glass.

The used slag material had the following composition:

| | |
|---|---|
| $Al_2O_3$ | 10.0% |
| CaO | 40.5% |
| $SiO_2$ | 35.5% |
| $TiO_2$ | 0.5% |
| $P_2O_5$ | 0.01% |
| $Na_2O$ | 0.4% |
| MnO | 0.3% |
| MgO | 7.0% |
| $K_2O$ | 0.7% |
| FeO | 0.3% |
| CaS | 0.7% |

Sample bodies were prepared and after 28 days the tensile strength and compressive strength were measured.

Results:

| Sample body | Tensile strength | Compressive strength |
|---|---|---|
| 1 | 10.6 N/mm² | 97.6 N/mm² |
| 2 | 10.5 N/mm² | 101.2 N/mm² |
| 3 | 10.3 N/mm² | 101.2 N/mm² |

Example 2

The building material according to the invention (C), when compared to quality (high-grade) concrete (A) and granite-monolith (B) has excellent properties in terms of water permeability. This may be best illustrated by the following theoretical example. Thus, assuming three containers (10×10×10 m) are made, the thickness of the walls being 20 cm, and assuming that the containers are filled with water and that loss of water is only possible through leakage through the walls of the containers the following results would be obtained.

A: within 100 days the container looses 1,000,000 of water due to the permeability of the walls ($K_F=10^{-6}$).

B: within 20,000 days (approximately 55 years) the container looses 1,000,000 of water due to the permeability of the walls ($K_F=10^{-9}$).

C: within 100,000,000 days (around 270,000 years) the container looses 1,000,000 of water due to the permeability of the walls ($K_F=10^{-12}$).

Example 3

Immersion of the building material of the invention into various media

A building material comprising of the following components was prepared:

| | |
|---|---|
| Industrial ashes comprising heavy metals | 1.110 kg |
| Slag material (3500 Blain) | 1.680 kg |
| "Basaltsplitt" | 0.100 kg |
| "Basaltmehl" | 0.050 kg |
| Activator TK1 | 0.375 kg |

-continued

| | |
|---|---|
| Activator TK2 | 0.375 kg |
| sodium metasilicate in solid form | 0.115 kg |

TK1: 30 units of sodium hydroxide in 200 liters of water, which is mixed with 100 units of waterglass.
TK2: 100 units sodium metasilicate in 400 units of water.

15 sample bodies sized ca. 4×4×16 cm and 4 sample bodies sized ca. 4×4×8 cm were prepared. One sample body was evaluated for both tensile strength: 5.5 N/mm² and compressive strength: 39.9 N/mm² prior to immersion.

During the first test series the reaction of the sample bodies to various defined aggressive media was evaluated. The immersion period was set at three months. Once per month the aggressive solutions and the water of the control series was changed and the state of the samples visually assessed. The pH and conductivity of the changed media was measured, and the "used" solutions were stored to measure the chloride and sulphate levels.

Media used:

tap water distilled water

North Sea water

Waste fluid

Acid buffered to pH 3.0-3.5 sulphate solution (10% $Na_2SO_4$-solution)

chalk dissolving carbon dioxide 14 sample bodies of 4×4×16 cm were tested. The 2 small sample bodies were used as control series. The 14 sample bodies were cut into 8 parts of each ca. 4×2×4 cm, which were numbered 1-14, measured and weighed. The fragments of the sample bodies were numbered, e.g. 1/1, 1/2, 1/3 . . . 1/8, measured and weighed, as well. All together, 112 samples were produced using this methodology.

For every medium, including the control series (tap water) 16 sample bodies were available and immersed in two glass bottles, per medium.

The sample bodies were immersed for three months using an immersion temperature of 20° C. The first change of media took place after one month, the second after two months.

Results:

After 1 month all sample bodies remained unchanged. However, on the surface of some of the sample bodies a white or multi-coloured layer could be observed.

The solutions were partly clear (tap water, distilled water and buffered acid), slightly coloured (carbon dioxide, sulphate solution), opaque (sea water) and brown-yellow and cloudy (waste water).

After the second month again no change could be observed.

Even after the third month, at the end of the immersion, no visible changes in the sample bodies and the solutions could be detected.

The measurements of pH values are depicted in Table 1. The values for each containers and the average values are given.

TABLE 1

|  | Original Solution | After | | | | | |
|---|---|---|---|---|---|---|---|
|  |  | Change 1 | Av | Change 2 | Av | Change 3 | Av |
| Tap water | 8.2 | 12.2 | 12.2 | 11.4 | 11.3 | 11.5 | 11.4 |
|  |  | 12.2 |  | 11.3 |  | 11.3 |  |
| Distilled | 6.1 | 12.1 | 12.2 | 11.0 | 11.2 | 11.3 | 11.3 |
|  |  | 12.1 |  | 11.5 |  | 11.4 |  |
| Waste water | 8.7 | 12.2 | 12.1 | 11.1 | 11.0 | 10.8 | 10.8 |
|  |  | 12.1 |  | 10.8 |  | 10.8 |  |
| Chalk $CO_2$ | 6.5 | 7.0 | 6.9 | 6.9 | 7.0 | 7.4 | 7.5 |
|  |  | 6.9 |  | 7.1 |  | 7.5 |  |
| Seawater | 7.7 | 12.4 | 12.4 | 10.0 | 10.2 | 9.9 | 10.0 |
|  |  | 12.4 |  | 10.3 |  | 10.0 |  |
| Buffered acid | 3.2 | 12.4 | 12.3 | 11.8 | 11.8 | 11.7 | 11.7 |
|  |  | 12.3 |  | 11.7 |  | 11.6 |  |
| Sulfate sol. | 7.8 | 12.8 | 12.7 | 12.4 | 12.4 | 12.1 | 12.1 |
|  |  | 12.7 |  | 12.4 |  | 12.1 |  |

Table 2 contains the conductivity measurements (DIN 38, 404, Sec 4) following completion of the immersion process.

TABLE 2

| Conductivity (DIN 38 404, Section 4) | | |
|---|---|---|
| µS/cm | Total Value | Mid-value |
| Tap water | 950/880 | 905 |
| Distilled water | 740/820 | 780 |
| Waste water | 1070/1050 | 1060 |
| Chalk $CO_2$ | 830/850 | 840 |
| Seawater | 95400/95600 | 95500 |
| Buffered acid | 980/820 | 900 |
| Sulfate solution | 39500/39500 | 39500 |

The results of the individual sample bodies are listed in Tables 3-9. The density of the sample bodies prior to the final evaluation apart from those immersed in sulphate solution was between 1.96-1.97 kg/dm³. It is significant to note the noticeably lower level of the density of the sample bodies placed in sulphate solution, which had an average value of 1.88 kg/dm³. While the deviation from the standard of raw densities in every other sample was 0.01-0.02 kg/dm³, the samples immersed in sulphate solution had 0.45 kg/dm³ deviation.

Glass 3 Tap water 3/2-10/2

Glass 4 Tap water 11/2-4/3

TABLE 3

| Nr | Sample body | Length (mm) | Width (mm) | Height (mm) | Weight (g) | Density (ky/dm³) | Pressure area (mm²) | F max (N) | Compr. strength (N/mm²) | F/t (N/s) |
|---|---|---|---|---|---|---|---|---|---|---|
| 1 | 3/2 | 40.20 | 37.90 | 18.30 | 54.87 | 1.97 | 1523.6 | 74738.7 | 49.05 | 888.51 |
| 2 | 4/2 | 40.40 | 37.70 | 18.20 | 54.18 | 1.95 | 1523.1 | 59731.4 | 39.22 | 889.58 |
| 3 | 5.2 | 39.80 | 37.70 | 18.40 | 54.17 | 1.96 | 1500.5 | 66392.0 | 44.25 | 890.19 |
| 4 | 6/2 | 41.00 | 37.50 | 18.50 | 55.42 | 1.95 | 1537.5 | 66079.2 | 42.98 | 885.77 |
| 5 | 7/2 | 41.00 | 38.10 | 18.90 | 57.81 | 1.96 | 1562.1 | 69108.1 | 44.24 | 886.85 |
| 6 | 8/2 | 41.40 | 37.90 | 18.80 | 57.00 | 1.93 | 1569.1 | 67834.0 | 43.23 | 844.00 |
| 7 | 9/2 | 40.50 | 37.60 | 18.80 | 56.72 | 1.98 | 1522.8 | 65056.8 | 42.72 | 878.52 |
| 8 | 10/2 | 39.80 | 38.20 | 18.50 | 54.52 | 1.94 | 1520.4 | 73060.2 | 48.05 | 889.52 |
| MtW |  | 40.51 | 37.82 | 18.55 | 55.59 | 1.96 | 1532.37 | 67750.06 | 44.22 | 881.61 |
| StA |  | 0.58 | 0.24 | 0.26 | 1.41 | 0.02 | 22.91 | 4706.80 | 3.11 | 15.66 |
| VKo |  | 1.44 | 0.64 | 1.38 | 2.53 | 0.81 | 1.50 | 6.95 | 7.04 | 1.78 |
| 9 | 11/2 | 39.60 | 37.70 | 18.40 | 54.01 | 1.97 | 1492.9 | 57106.9 | 38.25 | 888.79 |
| 10 | 12/2 | 41.60 | 37.80 | 18.20 | 55.57 | 1.94 | 1572.5 | 68085.8 | 43.30 | 878.09 |
| 11 | 13/2 | 40.30 | 37.60 | 18.40 | 54.30 | 1.95 | 1515.3 | 57213.7 | 37.76 | 882.93 |
| 12 | 14/2 | 40.60 | 37.90 | 18.50 | 55.68 | 1.96 | 1538.7 | 58167.4 | 37.80 | 883.92 |
| 13 | 1/3 | 41.10 | 38.50 | 18.60 | 57.51 | 1.95 | 1582.3 | 89311.1 | 56.44 | 891.67 |
| 14 | 2/3 | 39.30 | 37.90 | 18.60 | 54.89 | 1.98 | 1489.5 | 79148.5 | 53.14 | 891.81 |
| 15 | 3/3 | 40.90 | 37.80 | 18.90 | 57.48 | 1.97 | 1546.0 | 76676.6 | 49.60 | 889.47 |
| 16 | 4/3 | 40.20 | 37.90 | 18.30 | 54.32 | 1.95 | 1523.6 | 72808.4 | 47.79 | 885.30 |
| MtW |  | 40.45 | 37.89 | 18.49 | 55.47 | 1.96 | 1532.60 | 69814.79 | 45.51 | 886.50 |
| StA |  | 0.77 | 0.27 | 0.22 | 1.38 | 0.01 | 34.02 | 11845.43 | 7.34 | 4.79 |
| VKo |  | 1.89 | 0.71 | 1.17 | 2.50 | 0.66 | 2.22 | 16.97 | 16.12 | 0.54 |
| MtW |  | 40.48 | 37.86 | 18.52 | 55.53 | 1.96 | 1532.49 | 68782.43 | 44.86 | 884.06 |
| StA |  | 0.66 | 0.25 | 0.23 | 1.35 | 0.01 | 28.02 | 8772.42 | 5.48 | 11.47 |
| VKo |  | 1.63 | 0.66 | 1.25 | 2.43 | 0.72 | 1.83 | 12.75 | 12.22 | 1.30 |

Glass 1 distilled water 1/1-8/1

Glass 2 distilled water 9/1-2/2

TABLE 4

| Nr | Sample body | Length (mm) | Width (mm) | Height (mm) | Weight (g) | Density (ky/dm$^3$) | Pressure area (mm$^2$) | F max (N) | Compr. strength (N/mm$^2$) | F/t (N/s) |
|---|---|---|---|---|---|---|---|---|---|---|
| 1 | 1/1 | 40.20 | 35.70 | 18.30 | 51.78 | 1.97 | 1435.1 | 62134.7 | 43.30 | 897.09 |
| 2 | 2/1 | 39.60 | 38.00 | 18.40 | 55.06 | 1.99 | 1504.8 | 63035.0 | 41.89 | 881.85 |
| 3 | 3/1 | 39.40 | 37.40 | 18.40 | 53.93 | 1.99 | 1473.6 | 66651.4 | 45.23 | 888.79 |
| 4 | 4/1 | 40.30 | 38.40 | 18.00 | 55.61 | 2.00 | 1547.5 | 70908.7 | 45.82 | 878.01 |
| 5 | 5/1 | 40.70 | 37.40 | 18.60 | 55.88 | 1.97 | 1522.2 | 67818.7 | 44.55 | 882.91 |
| 6 | 6/1 | 41.50 | 38.00 | 18.40 | 56.82 | 1.96 | 1577.0 | 61303.1 | 38.87 | 885.72 |
| 7 | 7/1 | 41.30 | 37.80 | 18.70 | 57.13 | 1.96 | 1561.1 | 73273.8 | 46.94 | 887.95 |
| 8 | 8/1 | 40.10 | 37.50 | 18.70 | 55.44 | 1.97 | 1503.7 | 68833.4 | 45.77 | 889.61 |
| MtW | | 40.39 | 37.52 | 18.44 | 55.21 | 1.98 | 1515.64 | 66744.87 | 44.05 | 886.49 |
| StA | | 0.75 | 0.82 | 0.23 | 1.71 | 0.01 | 46.91 | 4311.41 | 2.62 | 5.81 |
| VKo | | 1.85 | 2.17 | 1.26 | 3.09 | 0.73 | 3.10 | 6.46 | 5.95 | 0.66 |
| 9 | 9/1 | 40.80 | 38.40 | 18.90 | 58.63 | 1.98 | 1566.7 | 69718.5 | 44.50 | 881.84 |
| 10 | 10/1 | 39.40 | 39.10 | 18.70 | 56.48 | 1.96 | 1540.5 | 73479.8 | 47.70 | 887.78 |
| 11 | 11/1 | 40.10 | 38.40 | 18.50 | 56.07 | 1.97 | 1539.8 | 62722.2 | 40.73 | 857.80 |
| 12 | 12/1 | 42.10 | 38.50 | 18.10 | 57.50 | 1.96 | 1620.8 | 75906.0 | 46.83 | 883.16 |
| 13 | 13/1 | 40.40 | 38.90 | 18.40 | 56.63 | 1.96 | 1571.6 | 62417.0 | 39.72 | 887.58 |
| 14 | 14/1 | 41.10 | 38.40 | 18.80 | 57.96 | 1.95 | 1578.2 | 57885.1 | 36.68 | 878.93 |
| 15 | 1/2 | 40.80 | 38.40 | 18.50 | 56.61 | 1.95 | 1566.7 | 68200.2 | 43.53 | 869.14 |
| 16 | 2/2 | 40.20 | 37.90 | 18.50 | 55.51 | 1.97 | 1523.6 | 71259.6 | 46.77 | 880.45 |
| MtW | | 40.61 | 38.50 | 18.55 | 56.92 | 1.96 | 1563.51 | 67698.56 | 43.31 | 878.34 |
| StA | | 0.80 | 0.36 | 0.25 | 1.03 | 0.01 | 29.93 | 6173.22 | 3.94 | 10.15 |
| VKo | | 1.97 | 0.94 | 1.35 | 1.81 | 0.47 | 1.91 | 9.12 | 9.10 | 1.16 |
| MtW | | 40.50 | 38.01 | 18.49 | 56.06 | 1.97 | 1539.57 | 67221.71 | 43.68 | 882.41 |
| StA | | 0.76 | 0.79 | 0.24 | 1.62 | 0.01 | 45.35 | 5167.31 | 3.26 | 9.03 |
| VKo | | 1.87 | 2.08 | 1.30 | 2.90 | 0.68 | 2.95 | 7.69 | 7.45 | 1.02 |

Glass 5 Waste water 5/3-12/3

Glass 6 Waste water 13/3-6/4

TABLE 5

| Nr | Sample body | Length (mm) | Width (mm) | Height (mm) | Weight (g) | Density (ky/dm$^3$) | Pressure area (mm$^2$) | F max (N) | Compr. strength (N/mm$^2$) | F/t (N/s) |
|---|---|---|---|---|---|---|---|---|---|---|
| 1 | 5/3 | 40.20 | 37.80 | 18.50 | 54.86 | 1.95 | 1519.6 | 77233.5 | 50.83 | 888.24 |
| 2 | 6/3 | 40.40 | 37.80 | 18.40 | 55.02 | 1.96 | 1527.1 | 62569.6 | 40.97 | 894.10 |
| 3 | 7/3 | 41.20 | 37.70 | 19.00 | 56.73 | 1.92 | 1553.2 | 74349.6 | 47.87 | 884.74 |
| 4 | 8/3 | 41.50 | 37.80 | 18.90 | 56.67 | 1.91 | 1568.7 | 74059.7 | 47.21 | 883.28 |
| 5 | 9/3 | 40.10 | 38.10 | 18.50 | 56.07 | 1.98 | 1527.8 | 68337.5 | 44.73 | 873.95 |
| 6 | 10/3 | 41.00 | 37.70 | 18.50 | 56.07 | 1.96 | 1545.7 | 72251.5 | 46.74 | 884.59 |
| 7 | 11/3 | 40.80 | 37.80 | 18.40 | 55.83 | 1.97 | 1542.2 | 69581.1 | 45.12 | 892.75 |
| 8 | 12/3 | 40.50 | 38.00 | 18.50 | 55.47 | 1.95 | 1539.0 | 73533.2 | 47.78 | 884.42 |
| MtW | | 40.71 | 37.84 | 18.59 | 55.84 | 1.95 | 1540.42 | 71489.47 | 46.41 | 885.76 |
| StA | | 0.50 | 0.14 | 0.23 | 0.69 | 0.02 | 15.89 | 4561.93 | 2.89 | 6.26 |
| VKo | | 1.22 | 0.37 | 1.23 | 1.24 | 1.21 | 1.03 | 6.38 | 6.22 | 0.71 |
| 9 | 13/3 | 40.90 | 37.70 | 18.40 | 54.85 | 1.93 | 1541.9 | 54444.2 | 35.31 | 900.92 |
| 10 | 14/3 | 40.50 | 37.90 | 18.20 | 55.09 | 1.97 | 1534.9 | 54650.2 | 35.60 | 890.72 |
| 11 | 1/4 | 41.90 | 38.40 | 18.70 | 58.77 | 1.95 | 1609.0 | 70954.5 | 44.10 | 890.46 |
| 12 | 2/4 | 41.00 | 37.70 | 18.50 | 56.61 | 1.98 | 1545.7 | 70618.8 | 45.69 | 892.22 |
| 13 | 3/4 | 39.40 | 37.70 | 18.70 | 55.26 | 1.99 | 1485.4 | 73220.4 | 49.29 | 890.44 |
| 14 | 4/4 | 40.20 | 37.90 | 18.40 | 54.84 | 1.96 | 1523.6 | 61570.2 | 40.41 | 897.71 |
| 15 | 5/4 | 40.50 | 37.50 | 18.60 | 55.65 | 1.97 | 1518.7 | 68360.4 | 45.01 | 889.74 |
| 16 | 6/4 | 40.00 | 37.70 | 18.20 | 54.36 | 1.98 | 1508.0 | 63454.6 | 42.08 | 887.98 |
| MtW | | 40.55 | 37.81 | 18.46 | 55.68 | 1.97 | 1533.41 | 64659.15 | 42.19 | 892.53 |
| StA | | 0.75 | 0.27 | 0.20 | 1.42 | 0.02 | 36.25 | 7345.16 | 4.90 | 4.44 |
| VKo | | 1.84 | 0.71 | 1.08 | 2.55 | 0.93 | 2.36 | 11.36 | 11.62 | 0.50 |
| MtW | | 40.63 | 37.82 | 18.52 | 55.76 | 1.96 | 1536.91 | 68074.31 | 44.30 | 889.14 |
| StA | | 0.62 | 0.21 | 0.22 | 1.08 | 0.02 | 27.28 | 6879.69 | 4.46 | 6.30 |
| VKo | | 1.52 | 0.55 | 1.17 | 1.94 | 1.13 | 1.77 | 10.11 | 10.06 | 0.71 |

31 Glass (7+8) "carbonic acid" 7/4-8/5

TABLE 6

| Nr | Sample body | Length (mm) | Width (mm) | Height (mm) | Weight (g) | Density (ky/dm$^3$) | Pressure area (mm$^2$) | F max (N) | Compr. strength (N/mm$^2$) | F/t (N/s) |
|---|---|---|---|---|---|---|---|---|---|---|
| 1 | 7/4 | 41.60 | 37.70 | 18.40 | 57.33 | 1.99 | 1568.3 | 71999.7 | 45.91 | 885.90 |
| 2 | 8/4 | 40.10 | 37.80 | 18.50 | 55.25 | 1.97 | 1515.8 | 61974.5 | 40.89 | 887.71 |
| 3 | 9/4 | 40.10 | 37.60 | 18.50 | 54.66 | 1.96 | 1507.8 | 60288.4 | 39.99 | 889.87 |
| 4 | 10/4 | 41.90 | 37.60 | 18.50 | 57.33 | 1.97 | 1575.4 | 68253.6 | 43.32 | 878.09 |
| 5 | 11/4 | 41.40 | 37.70 | 18.20 | 56.28 | 1.98 | 1560.5 | 61593.0 | 39.46 | 886.55 |
| 6 | 12/4 | 39.90 | 37.70 | 18.60 | 55.15 | 1.97 | 1504.2 | 65873.2 | 43.79 | 883.81 |
| 7 | 13/4 | 40.40 | 37.70 | 18.60 | 56.45 | 1.99 | 1523.1 | 57763.0 | 37.93 | 881.75 |
| 8 | 14/4 | 40.40 | 37.80 | 18.00 | 54.19 | 1.97 | 1527.1 | 64004.0 | 41.91 | 880.14 |
| MtW | | 40.72 | 37.70 | 18.41 | 55.83 | 1.97 | 1535.31 | 63968.68 | 41.65 | 884.23 |
| StA | | 0.78 | 0.08 | 0.21 | 1.19 | 0.01 | 28.47 | 4600.64 | 2.61 | 4.02 |
| VKo | | 1.92 | 0.20 | 1.14 | 2.13 | 0.55 | 1.85 | 7.19 | 6.26 | 0.45 |
| 9 | 1/5 | 42.20 | 35.50 | 18.30 | 53.83 | 1.96 | 1498.1 | 65972.4 | 44.04 | 881.50 |
| 10 | 2/5 | 39.30 | 37.40 | 18.40 | 53.46 | 1.98 | 1469.8 | 66063.9 | 44.95 | 880.18 |
| 11 | 3/5 | 40.70 | 37.80 | 18.20 | 55.61 | 1.99 | 1538.5 | 71549.6 | 46.51 | 887.06 |
| 12 | 4/5 | 40.50 | 37.80 | 18.90 | 57.43 | 1.98 | 1530.9 | 59327.1 | 38.75 | 889.04 |
| 13 | 5/5 | 41.40 | 39.40 | 18.60 | 59.84 | 1.97 | 1631.2 | 70359.3 | 43.13 | 887.11 |
| 14 | 6/5 | 40.70 | 38.30 | 19.10 | 58.44 | 1.96 | 1558.8 | 78843.4 | 50.58 | 886.38 |
| 15 | 7/5 | 40.30 | 38.00 | 18.00 | 54.82 | 1.99 | 1531.4 | 69199.7 | 45.19 | 856.36 |
| 16 | 8/5 | 39.60 | 38.60 | 18.50 | 55.44 | 1.96 | 1528.6 | 70305.9 | 45.99 | 886.56 |
| MtW | | 40.59 | 37.85 | 18.50 | 56.10 | 1.97 | 1535.90 | 68952.66 | 44.89 | 881.78 |
| StA | | 0.93 | 1.13 | 0.36 | 2.26 | 0.01 | 47.06 | 5584.67 | 3.33 | 10.70 |
| VKo | | 2.28 | 2.98 | 1.96 | 4.03 | 0.59 | 3.06 | 8.10 | 7.42 | 1.21 |
| MtW | | 40.66 | 37.77 | 18.46 | 55.97 | 1.97 | 1535.61 | 66460.67 | 43.27 | 883.00 |
| StA | | 0.83 | 0.78 | 0.29 | 1.75 | 0.01 | 37.57 | 5572.80 | 3.34 | 7.91 |
| VKo | | 2.04 | 2.06 | 1.57 | 3.13 | 0.55 | 2.45 | 8.39 | 7.72 | 0.90 |

Glass 9 Sea Water 9/5-2/6

Glass 10 Sea Water 3/6-10/6

TABLE 7

| Nr | Sample body | Length (mm) | Width (mm) | Height (mm) | Weight (g) | Density (ky/dm$^3$) | Pressure area (mm$^2$) | F max (N) | Compr. strength (N/mm$^2$) | F/t (N/s) |
|---|---|---|---|---|---|---|---|---|---|---|
| 1 | 9/5 | 41.30 | 37.70 | 18.40 | 56.42 | 1.97 | 1557.0 | 60601.2 | 38.92 | 887.85 |
| 2 | 10/5 | 39.40 | 38.20 | 18.50 | 55.18 | 1.98 | 1505.1 | 63973.4 | 42.51 | 877.23 |
| 3 | 11/5 | 39.70 | 38.50 | 18.70 | 57.00 | 1.99 | 1528.4 | 65239.9 | 42.68 | 889.42 |
| 4 | 12/5 | 39.70 | 38.00 | 18.70 | 55.46 | 1.97 | 1508.6 | 73022.0 | 48.40 | 893.50 |
| 5 | 13/5 | 40.40 | 38.10 | 18.70 | 57.03 | 1.98 | 1539.2 | 68291.8 | 44.37 | 881.93 |
| 6 | 14/5 | 40.60 | 37.60 | 19.50 | 58.11 | 1.95 | 1526.6 | 64522.8 | 42.27 | 885.97 |
| 7 | 1/6 | 41.60 | 38.70 | 18.70 | 58.72 | 1.95 | 1609.9 | 72663.5 | 45.13 | 884.42 |
| 8 | 2/6 | 39.80 | 38.20 | 18.60 | 56.40 | 1.99 | 1520.4 | 67277.0 | 44.25 | 883.12 |
| MtW | | 40.31 | 38.12 | 18.72 | 56.79 | 1.97 | 1536.90 | 66948.96 | 43.57 | 885.43 |
| StA | | 0.81 | 0.37 | 0.33 | 1.21 | 0.02 | 33.82 | 4299.56 | 2.73 | 4.97 |
| VKo | | 2.00 | 0.97 | 1.78 | 2.13 | 0.87 | 2.20 | 6.42 | 6.26 | 0.56 |
| 9 | 3/6 | 40.00 | 38.10 | 19.00 | 57.16 | 1.97 | 1524.0 | 69825.3 | 45.82 | 880.09 |
| 10 | 4/6 | 40.40 | 38.30 | 19.10 | 57.74 | 1.95 | 1547.3 | 64232.9 | 41.51 | 895.03 |
| 11 | 5/6 | 40.40 | 38.40 | 18.90 | 56.99 | 1.94 | 1551.4 | 65468.8 | 42.20 | 894.19 |
| 12 | 6/6 | 41.30 | 38.00 | 18.80 | 57.74 | 1.96 | 1569.4 | 67917.9 | 43.28 | 891.16 |
| 13 | 7/6 | 40.80 | 38.00 | 18.30 | 56.15 | 1.98 | 1550.4 | 64133.7 | 41.37 | 871.38 |
| 14 | 8/6 | 40.70 | 38.10 | 18.70 | 57.22 | 1.97 | 1550.7 | 72144.7 | 46.52 | 881.54 |
| 15 | 9/6 | 40.80 | 38.10 | 18.50 | 56.77 | 1.97 | 1554.5 | 61028.5 | 39.26 | 870.21 |
| 16 | 10/6 | 39.90 | 38.10 | 18.70 | 55.84 | 1.96 | 1520.2 | 61448.1 | 40.42 | 891.54 |
| MtW | | 40.54 | 38.14 | 18.75 | 56.95 | 1.96 | 1545.98 | 65774.97 | 42.55 | 884.39 |
| StA | | 0.46 | 0.14 | 0.26 | 0.68 | 0.01 | 16.22 | 3927.69 | 2.53 | 10.02 |
| VKo | | 1.13 | 0.37 | 1.40 | 1.20 | 0.63 | 1.05 | 5.97 | 5.96 | 1.13 |
| MtW | | 40.42 | 38.13 | 18.74 | 56.87 | 1.97 | 1541.44 | 66361.96 | 43.06 | 884.91 |
| StA | | 0.65 | 0.27 | 0.29 | 0.95 | 0.02 | 26.05 | 4024.12 | 2.60 | 7.66 |
| VKo | | 1.60 | 0.71 | 1.55 | 1.67 | 0.77 | 1.69 | 6.06 | 6.03 | 0.87 |

Glass 11 Buffered acid pH 3.2 11/6-4/7

Glass 12 Buffered acid pH 3.2 5/7-12/7

TABLE 8

| Nr | Sample body | Length (mm) | Width (mm) | Height (mm) | Weight (g) | Density (ky/dm$^3$) | Pressure area (mm$^2$) | F max (N) | Compr. strength (N/mm$^2$) | F/t (N/s) |
|---|---|---|---|---|---|---|---|---|---|---|
| 1 | 11/6 | 39.50 | 38.00 | 18.70 | 55.34 | 1.97 | 1501.0 | 66460.7 | 44.28 | 887.71 |
| 2 | 12/6 | 42.00 | 37.90 | 19.20 | 58.89 | 1.93 | 1591.8 | 68368.0 | 42.95 | 885.32 |
| 3 | 13/6 | 40.20 | 38.00 | 18.80 | 56.35 | 1.96 | 1527.6 | 61615.9 | 40.34 | 888.76 |
| 4 | 14/6 | 40.50 | 37.90 | 19.00 | 57.00 | 1.95 | 1534.9 | 57518.9 | 37.47 | 889.94 |
| 5 | 1/7 | 41.00 | 38.70 | 18.50 | 57.16 | 1.95 | 1586.7 | 71694.5 | 45.18 | 888.72 |
| 6 | 2/7 | 40.10 | 38.00 | 18.50 | 55.54 | 1.97 | 1523.8 | 60265.5 | 39.55 | 817.95 |
| 7 | 3/7 | 40.30 | 38.30 | 18.80 | 57.00 | 1.96 | 1543.5 | 77218.3 | 50.03 | 892.76 |
| 8 | 4/7 | 40.40 | 38.10 | 18.90 | 56.58 | 1.94 | 1539.2 | 62478.1 | 40.59 | 887.65 |
| MtW | | 40.50 | 38.11 | 18.80 | 56.73 | 1.96 | 1543.57 | 65702.49 | 42.55 | 879.10 |
| StA | | 0.74 | 0.27 | 0.24 | 1.10 | 0.02 | 31.02 | 6544.65 | 3.96 | 24.92 |
| VKo | | 1.82 | 0.71 | 1.27 | 1.94 | 0.77 | 2.01 | 9.96 | 9.30 | 2.84 |
| 9 | 5/7 | 39.80 | 37.80 | 18.60 | 55.47 | 1.98 | 1504.4 | 66697.2 | 44.33 | 892.83 |
| 10 | 6/7 | 40.40 | 37.90 | 18.70 | 56.32 | 1.97 | 1531.2 | 60112.9 | 39.26 | 887.05 |
| 11 | 7/7 | 41.00 | 38.10 | 18.30 | 55.99 | 1.96 | 1562.1 | 69550.6 | 44.52 | 890.95 |
| 12 | 8/7 | 41.20 | 38.00 | 18.40 | 56.05 | 1.95 | 1565.6 | 68261.2 | 43.60 | 887.03 |
| 13 | 9/7 | 40.40 | 37.90 | 18.70 | 55.42 | 1.94 | 1531.2 | 65522.2 | 42.79 | 893.83 |
| 14 | 10/7 | 40.90 | 38.10 | 18.50 | 56.68 | 1.97 | 1558.3 | 79736.0 | 51.17 | 887.55 |
| 15 | 11/7 | 40.40 | 38.20 | 18.80 | 56.62 | 1.95 | 1543.3 | 66697.2 | 43.22 | 883.82 |
| 16 | 12/7 | 40.40 | 38.00 | 18.70 | 55.70 | 1.94 | 1535.2 | 73891.8 | 48.13 | 896.65 |
| MtW | | 40.56 | 38.00 | 18.59 | 56.03 | 1.96 | 1541.40 | 68808.65 | 44.63 | 889.96 |
| StA | | 0.45 | 0.13 | 0.17 | 0.49 | 0.02 | 20.41 | 5872.81 | 3.59 | 4.30 |
| VKo | | 1.10 | 0.34 | 0.93 | 0.87 | 0.80 | 1.32 | 8.53 | 8.05 | 0.48 |
| MtW | | 40.53 | 38.06 | 18.69 | 56.38 | 1.96 | 1542.49 | 67255.57 | 43.59 | 884.53 |
| StA | | 0.59 | 0.21 | 0.23 | 0.90 | 0.01 | 25.39 | 6217.44 | 3.81 | 18.17 |
| VKo | | 1.45 | 0.56 | 1.23 | 1.59 | 0.76 | 1.65 | 9.24 | 8.73 | 2.05 |

Glass 13 sodium sulphate solution 13/7-6/8

Glass 14 sodium sulphate solution 7/8-14/8

TABLE 9

| Nr | Sample body | Length (mm) | Width (mm) | Height (mm) | Weight (g) | Density (ky/dm$^3$) | Pressure area (mm$^2$) | F max (N) | Compr. strength (N/mm$^2$) | F/t (N/s) |
|---|---|---|---|---|---|---|---|---|---|---|
| 1 | 13/7 | 40.40 | 37.90 | 18.90 | 57.38 | 1.98 | 1531.2 | 73182.3 | 47.80 | 894.49 |
| 2 | 14/7 | 40.40 | 38.10 | 18.80 | 57.58 | 1.99 | 1539.2 | 60860.6 | 39.54 | 875.28 |
| 3 | 1/8 | 40.50 | 38.40 | 18.70 | 57.83 | 1.99 | 1555.2 | 71603.0 | 46.04 | 884.11 |
| 4 | 2/8 | 40.90 | 38.00 | 18.50 | 57.29 | 1.99 | 1554.2 | 78080.4 | 50.24 | 884.66 |
| 5 | 3/8 | 39.70 | 38.00 | 18.60 | 55.70 | 1.99 | 1508.6 | 76249.3 | 50.54 | 889.91 |
| 6 | 4/8 | 40.30 | 37.60 | 18.80 | 56.63 | 1.99 | 1515.3 | 69474.3 | 45.85 | 889.78 |
| 7 | 5/8 | 39.50 | 38.10 | 18.60 | 55.88 | 2.00 | 1504.9 | 80087.0 | 53.22 | 887.62 |
| 8 | 6/8 | 39.90 | 37.90 | 18.90 | 57.02 | 2.00 | 1512.2 | 72846.6 | 48.17 | 878.88 |
| MtW | | 40.20 | 38.00 | 18.72 | 56.91 | 1.99 | 1527.60 | 72797.93 | 47.67 | 885.59 |
| StA | | 0.46 | 0.23 | 0.15 | 0.78 | 0.00 | 20.28 | 5953.04 | 4.10 | 6.26 |
| VKo | | 1.15 | 0.60 | 0.79 | 1.37 | 0.24 | 1.33 | 8.18 | 8.61 | 0.71 |
| 9 | 7/8 | 41.60 | 38.30 | 19.00 | 59.72 | 1.97 | 1593.3 | 80689.7 | 50.64 | 884.26 |
| 10 | 8/8 | 41.50 | 37.90 | 182.00 | 57.11 | 0.20 | 1572.8 | 81879.9 | 52.06 | 881.29 |
| 11 | 9/8 | 40.10 | 37.90 | 18.80 | 56.64 | 1.98 | 1519.8 | 73563.7 | 48.40 | 892.74 |
| 12 | 10/8 | 41.90 | 37.90 | 18.70 | 58.85 | 1.98 | 1588.0 | 70122.8 | 44.16 | 895.81 |
| 13 | 11/8 | 41.10 | 37.90 | 18.80 | 58.44 | 2.00 | 1557.7 | 76707.1 | 49.24 | 878.58 |
| 14 | 12/8 | 41.40 | 38.20 | 18.90 | 59.01 | 1.97 | 1581.5 | 76432.4 | 48.33 | 879.84 |
| 15 | 13/8 | 40.40 | 37.70 | 18.90 | 57.13 | 1.98 | 1523.1 | 73884.2 | 48.51 | 888.59 |
| 16 | 14/8 | 40.40 | 38.00 | 18.50 | 56.63 | 1.99 | 1535.2 | 71671.6 | 46.69 | 887.42 |
| MtW | | 41.05 | 37.97 | 39.20 | 57.94 | 1.76 | 1558.92 | 75618.94 | 48.50 | 886.07 |
| StA | | 0.67 | 0.19 | 57.70 | 1.20 | 0.63 | 29.54 | 4136.60 | 2.39 | 6.19 |
| VKo | | 1.62 | 0.50 | 147.19 | 2.08 | 35.83 | 1.90 | 5.47 | 4.93 | 0.70 |
| MtW | | 40.62 | 37.99 | 28.96 | 57.43 | 1.88 | 1543.26 | 74208.44 | 48.09 | 885.83 |
| StA | | 0.71 | 0.20 | 40.81 | 1.11 | 0.45 | 29.34 | 5161.93 | 3.27 | 6.02 |
| VKo | | 1.74 | 0.53 | 140.91 | 1.94 | 23.83 | 1.90 | 6.96 | 6.81 | 0.68 |

It is important to note that the measured raw densities of the samples immersed in sulphate solution had raw densities similar to the other samples prior to immersion. Apparently, a reaction took place during the immersion which indicates that sulphate has penetrated into the sample bodies and becomes crystallized.

The average measured compressive strength of the samples after the immersion was 44.45 N/mm². This meets the standards of samples immersed in tap water. The average compressive strength values are lower than of the control series with the exception of the compressive strength of samples immersed in sulphate, which have an average value of 48.10 N/mm². In summary, following three months of immersion the sample bodies showed no significant damage. They remained solid.

The invention claimed is:

1. A method for preparing a building material, comprising:
   mixing an aggregate material, water, a hydraulic binder material, and hydraulic activators; and
   allowing the building material to harden;
   wherein the hydraulic binder material consists of slag material, the slag material being the only hydraulic binder, and the hydraulic activators are a mixture of alkaline activators comprising alkali metals and/or solutions thereof, and waterglass with a ratio between sodium and silicium of 1:1.5 or less,
   wherein the hydraulic activators are a mixture of sodium hydroxide, waterglass, and sodium metasilicate and/or a solution thereof.

2. The method of claim 1, wherein the slag material is ground to a specific area of approximately 3000-5000 cm²/g.

3. The method of claim 1, wherein the slag material is ground to a specific area of approximately 3500 cm²/g.

4. The method of claim 1, wherein the slag material includes CaO and $SiO_2$, and the ratio $CaO/SiO_2$ ranges from 0.25-2.0.

5. The method of claim 1, wherein the slag material includes $Al_2O_3$ and $SiO_2$, and the ratio $Al_2O_3/SiO_2$ ranges from 0.1-0.6.

6. The method of claim 1, wherein the slag material is ground granulated blast furnace slag.

7. The method of 6, wherein the slag material is an amorphous ground granulated blast furnace slag material.

8. The method of claim 1, further comprising adding one or more additives to the aggregate material, water, hydraulic binder material, and hydraulic activators, before or during mixing.

9. The method of claim 8, wherein an additive of the one or more additives comprises bivalent iron.

10. The method of claim 8, wherein an additive of the one or more additives comprises potassium dichromate.

11. A building material prepared by the method of claim 1.

12. The method of claim 1, wherein the slag material comprises a crystalline phase of 5-40%.

13. The method of claim 1, wherein the water is sea water.

14. The method of claim 1, wherein after 28 days, the compressive strength of the hardened building material is at least 97.6 N/mm².

15. The method of claim 14, wherein after 28 days, the tensile strength of the hardened building material is at least 10.3 N/mm².

16. The method of claim 1, wherein the ratio between sodium and silicium is 1:1.2.

* * * * *